United States Patent [19]

Narasawa

[11] Patent Number: 4,739,421

[45] Date of Patent: Apr. 19, 1988

[54] RECORDING AND/OR REPRODUCING APPARATUS INCLUDING DEVICE FOR SECURING A TAPE WRAPPING MECHANISM AT A PREDETERMINED POSITION

[75] Inventor: Takashi Narasawa, Kanagawa, Japan

[73] Assignee: Canon Kabushiki Kaisha, Tokyo, Japan

[21] Appl. No.: 27,096

[22] Filed: Mar. 13, 1987

Related U.S. Application Data

[63] Continuation of Ser. No. 613,589, May 23, 1984, abandoned.

[30] Foreign Application Priority Data

May 27, 1983 [JP] Japan ................... 58-93781

[51] Int. Cl.⁴ ............................................. G11B 5/027
[52] U.S. Cl. .......................... 360/85; 360/81; 360/130.22
[58] Field of Search ................ 360/84, 85, 95, 130.21, 360/130.22, 130.23; 242/198; 226/190, 194

[56] References Cited

U.S. PATENT DOCUMENTS

| | | | |
|---|---|---|---|
| 4,258,399 | 3/1981 | Iijima et al. | 360/85 |
| 4,369,473 | 1/1983 | Eibensteiner | 360/84 |
| 4,491,886 | 1/1985 | Saito et al. | 360/85 |
| 4,517,613 | 5/1985 | Shibaike et al. | 360/85 |
| 4,520,411 | 5/1985 | Ohshima | 360/95 |

FOREIGN PATENT DOCUMENTS

| | | | |
|---|---|---|---|
| 0141075 | 9/1982 | Japan | 360/85 |
| 2087629 | 5/1982 | United Kingdom | 360/85 |

Primary Examiner—Stuart N. Hecker
Assistant Examiner—Andrew L. Sniezek
Attorney, Agent, or Firm—Robin, Blecker & Daley

[57] ABSTRACT

A tape recording and/or reproducing apparatus in which a record bearing tape is wrapped about a cylindrical body and signal recording and/or reproduction is performed by rotating heads. A carriage carrying a tape wrapping member is moved by a movable member to a predetermined position to wrap the tape about the cylindrical body. A connecting rod connects the carriage and the movable member so that the rod extends almost perpendicular to a plane of the carriage and loosely engages either the carriage or the movable member. When the carriage is stopped at the predetermined position by a stopper while the movable member is slightly overdriven or over-moved, the connecting rod exerts a moment on the carriage and secures the carriage firmly at the predetermined position.

18 Claims, 3 Drawing Sheets

RECORDING AND/OR REPRODUCING APPARATUS INCLUDING DEVICE FOR SECURING A TAPE WRAPPING MECHANISM AT A PREDETERMINED POSITION

This is a continuation of application Ser. No. 613,589, filed May 23, 1984, now abandoned.

BACKGROUND OF THE INVENTION

1. Field of the Invention

The present invention relates to a recording and/or reproducing apparatus arranged to use a tape or belt shaped record bearing medium, and more particularly to an apparatus in which the medium is wrapped about cylindrical means and signal recording and/or reproduction is performed by rotating head means, such as VCR (Video Cassette Recorder) or the like.

2. Description of the Prior Art

In a magnetic recording and/or reproducing apparatus and particulary in a video cassette recorder (hereinafter will be called VCR for short), after a tape placed within a cassette is pulled out by tape extracting means according as a loading ring turns and is wrapped about a drum or cylinder assembly which is equipped with one or more rotary heads, the tape extracting means must be accurately positioned in a predetermined place and firmly kept there.

The positioning operation on the conventional tape extracting means in loading the tape has been performed in the following manner and as will be described in further details later herein with reference to FIGS. 1 and 2 of the accompanying drawings: For example, the tape extracting means is moved along a guide rail groove or slot through a pushing rod connected to a block provided on a loading ring according as the loading ring turns; and then a slanting or tapered part of the base of the tape extractng means fits into a space between a stopper pin provided below the guide rail and the lower surface of the guide rail. In accordance with this method, however, the direction of a force produced between the stopper pin and the slanting or tapered face of the base of the tape extracting means relative to the guide rail varies with the machining precision of the slanting or tapered face. Therefore, the positioning operation on the tape extracting means becomes unstable. The unstable positioning of the tape extracting means causes the tape pulled out by the extracting means to totter and thus deteriorates the quality of signal recording and/or reproduction.

SUMMARY OF THE INVENTION

It is therefore a principal object of the present invention to provide a novel recording and/or reproducing apparatus capable of eliminating the above-stated shortcoming of the prior art apparatus.

It is a more specific object of this invention to provide a recording and/or reproducing apparatus of the kind having wrapping means for wrapping a belt shaped recorded bearing medium about cylindrical means, wherein the wrapping means is accurately positioned to a predetermined position and fixed there without fail.

Under these objects and according to a preferred embodiment embodying an aspect of the present invention, a recording and/or reproducing apparatus arranged to use a belt shaped record bearing medium, comprises: recording and/or reproducing means including recording and/or reproducing head means and cylindrical means for guiding the record bearing medium relative to the head means; wrapping means for wrapping the medium about the cylindrical means; guide means for guiding the wrapping means around the cylindrical means; stopper means for stopping the wrapping means at a predetermined position; drive means for moving the wrapping means along said guide means; control means for controlling the drive means; and connecting means for operatively connecting the drive means and the wrapping means; wherein the connecting means includes a rod member provided almost perpendicularly to the wrapping means and loosely engaged with at least one of the wrapping means and the drive means, and the control means is arranged to deactivate the drive means in an overdrive condition relative to the stoppage of the wrapping means at the predetermined position so that a moment is exerted on the wrapping means through the rod member and the wrapping means is firmly secured relative to the stopper means at the predetermined position.

These and other object and features of the invention will become apparent from the following description taken in connection with the accompanying drawings.

BRIEF DESCRIPTION OF THE DRAWINGS

A preferred embodiment is given as shown in the accompanying drawings in which.

DETAILED DESCRIPTION OF THE PREFERRED EMBODIMENTS

Figure 1:
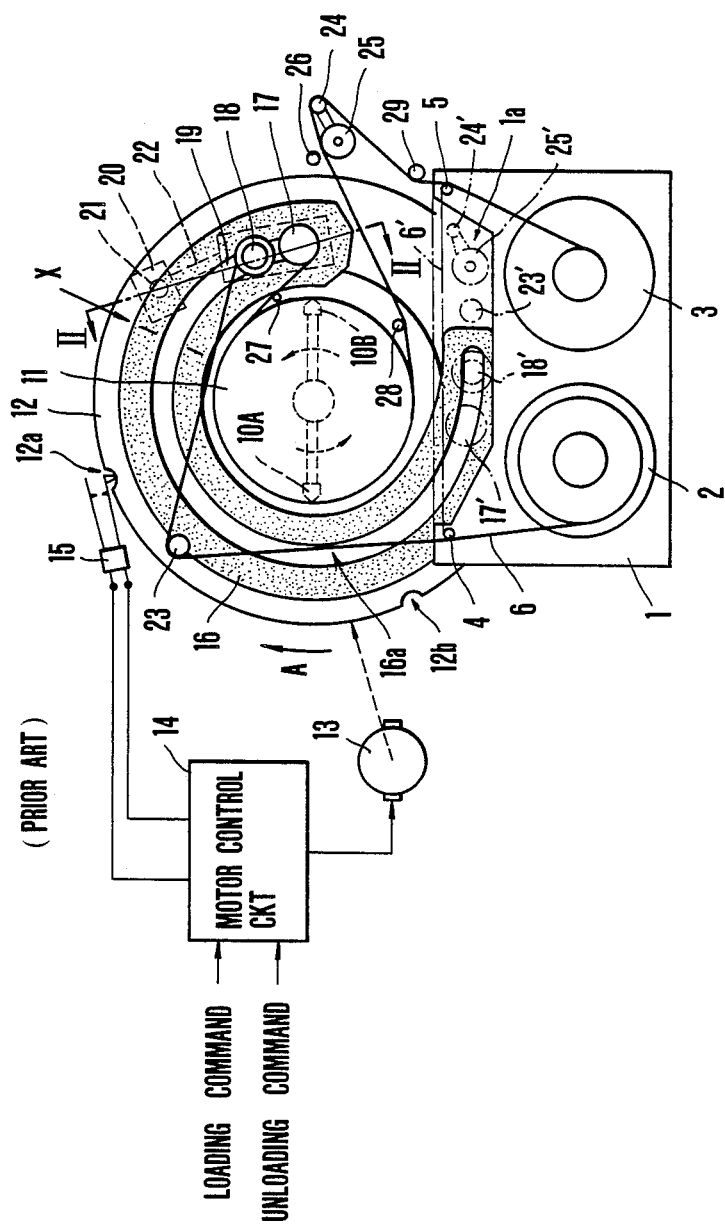
FIG. 1 is a schematic view showing by way of example a tape loading mechanism of the conventional VCR.
Figure 2:
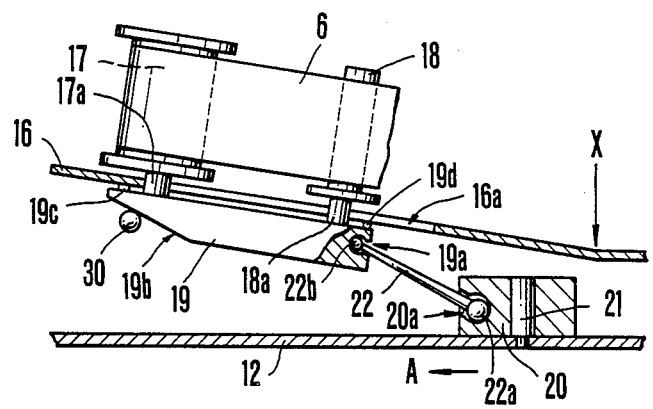
FIG. 2 is a sectional view taken along line II—II of FIG. 1.

Before describing the embodiment of the invention, the tape loading mechanism employed in the conventional VCR is described with reference to FIGS. 1 and 2 as follows: In FIG. 1, a tape cassette 1 includes supply and take-up reels 2 and 3, fixed tape guide posts 4 and 5, and a magnetic tape 6 or a belt shaped record bearing medium. A drum assembly 11 which is cylindrical means for guiding the magnetic tape, includes rotary recording and reproducing magnetic heads 10A and 10B which are opposed to each other at an angle of 180 degrees, a fixed lower drum and a rotary upper drum in a known manner. A loading ring 12 is arranged to be turnable around the drum assembly 11. A loading motor 13 is arranged to cause the loading ring 12 to turn. A motor control circuit 14 is arranged to control the motor 13 in response to a loading command, unloading command and the output of a position detecting switch 15. The position detecting switch 15 is arranged to be turned off by a notch 12a provided on the periphery of the loading ring 12 when the loading ring 12 is somewhat overdriven or overshot relative to the stopping position of the tape wrapping means in a tape loading completed condition and also to be turned off by another notch 12b of the ring 12 at a stopping position in an unloading completed condition. With the exception of these notches 12a and 12b, the switch 15 is arranged to be turned on by the periphery of the loading ring 12. Drive means is formed jointly by the loading ring 12 and the motor 13 for driving the tape wrapping means. Control means is formed by the control circuit 14 and a switch 15. A guide ring 16 is provided with a guide groove or slot 16a for guiding the tape wrapping means about the drum assembly 11 and, as will be understood from FIG. 2, is fixedly disposed above and along the loading ring 12. Also, as will be understood from FIG. 2, the guide ring 16 is arranged in parallel with the loading ring 12 on the left hand side of a point X in FIG. 1 and the distance of its gradually increases upward from the ring 12 on the right hand side of the point X. As shown in detail in FIG. 2, a tape guide roller 17 and a tape guide post 18 which are provided with smaller diameter parts 17a and 18a are inserted into the guide groove or slot 16a of the guide ring 16 and are erected on a movable base or carriage 19 disposed below the guide ring 16. The roller 17 is rotatable on a shaft connected to the smaller diameter part 17a while the post 18 is stationary. These members constitute the tape wrapping means. A drive block 20 is secured to the loading ring 12 by means of a pin 21 and is arranged to form drive means for driving the tape wrapping means in conjunction with the loading ring 12. A joint rod 22 serves as connecting means for operatively connecting the drive block 20 to the carriage 19. Ball parts 22a and 22b which are formed at both ends of the rod 22 are respectively fitted into ball receptacles 20a and 19a which are formed at the front end of the block 20 and at the rear end of the carriage 19.

Again referring to FIG. 1, another tape guide post 23 is arranged to be moved by another moving means connected to the loading ring 12. A tape guide post 24 and a pinch roller 25 are arranged to be moved by some other moving means connected to the loading ring 12. A capstan 26 is arranged to feed the tape. Fixed tape guide posts 27 and 28 are arranged to define respectively a tape entrance passage and a tape exit passage relative to the drum assembly 11. Another fixed tape guide post 29 is arranged to define the entrance passage of the tape 6 into the cassette 1. In FIG. 2, the carriage 19 is arranged to come to stop at a stopper pin 30 in a tape loading completed condition. Accordingly, the stop position of the tape wrapping means is defined by the stopper pin 30.

In a tape unloaded condition, the tape 6 is in a state of being hung on guide posts 4 and 5 within the cassette 1 as shown by a reference numeral 6' in FIG. 1. Meanwhile, the tape guide roller 17, the tape guide posts 18, 23 and 24 and the pinch roller 25 are on the reverse side of the tape 6 which is in the position 6' and remain within an opening 1a of the cassette 1 as respectively indicated with apostrophes affixed to their reference numerals respectively. When a tape loading command is given to the motor control circuit 14 in this condition, the circuit 14 causes the loading motor 13 to make, for example, forward rotation. The loading ring 12 then turns in the direction of arrow A as shown in FIGS. 1 and 2. With loading ring 12 turned in the direction of arrow A, the carriage 19 is moved by the block 20 and the joint rod 22 provided on the loading ring 12 in the same direction while guided by the guide groove 16a of the guide ring 16. Accordingly, the guide roller 17 and the post 18 pull out the tape 6 from the cassette 1. Then, the tape 6 is wrapped helically about the outer circumferential surface of the drum assembly 11 and is caused to travel in that state. Further, at that time, the tape guide posts 23 and 24 and the pinch roller 25 are also have their positions shifted to positions indicated by full lines in FIG. 1. In the loading completed position thereof, the carriage 19 comes to stop with its tapered face 19b colliding with the stopper pin 30. Then, a reaction force produced from the stopper pin 30 causes the abutting parts 19c and 19d of the upper surface of the carriage 19 to abut on the lower surface of the guide ring 16 for positioning. With the carriage 19 having been thus brought to stop by the stopper pin 30, when the loading ring 12 comes to a point where it is slightly overdriven or overshot, the notch 12a of the loading ring 12 turns off the detecting switch 15 as shown in FIG. 1. This causes the motor control circuit 14 to bring the motor 13 to stop. Further, under the loading completed condition, the guide posts 23 and 24 and the pinch roller 25 are stopped in their positions shown by full lines in FIG. 1. As a result of that, the tape 6 is wrapped helically about the circumference of the drum assembly 11 over a predetermined range thereof.

In unloading the tape 6, the motor control circuit 14 causes the motor 13 to make reverse rotation in response to a tape unloading command. The reverse rotation of the motor 13 causes the loading ring 12 to turn in the direction opposite to the direction of arrow A. Accordingly, the tape guide roller 17, tape guide posts 18, 23 and 24 and the pinch roller 25 are brought back to their positions 17', 18', 23', 24' and 25' within the opening 1a of the cassette 1 as indicated by one-dot chain lines in FIG. 1. Meanwhile, the tape reels 2 and/or 3 are then rotated in the tape take-up direction, so that the tape 6 which has been pulled out is pulled back into the cassette 1 as indicated by a one-dot chain line. Upon completion of tape unloading, the switch 15 is turned off by the notch 12b of the loading ring 12. The motor control circuit 14 then brings the motor 13 to stop.

Under the tape loading completed condition, the carriage 19 must be accurately positioned. If not, the tension of the tape 6 comes to shake the roller 17 and the post 18. The shaky state of the roller 17 and the post 18 results in the unstable travel of the tape 6 to disturb the recording or reproduced signal to a great extent.

In view of this, the conventional VCR described above is arranged to have the carriage 19 positioned by pressing it against the lower surface of the guide ring 16 by a reaction force produced by the impingement of the tapered face 19b of the carriage 19 on the stopper pin 30. According to the conventional arrangement, however, the contact between the stopper pin 30 and the tapered face 19b of the carriage 19 is dependent on the machining precision and positioning accuracy of the stopper pin 30 and the machining and assembling precision of the tapered face 19b of the carriage 19. The direction in which the reaction force to be exerted on the carriage 19 fluctuates with the contacting state. Further, since the carriage 19 is pushed against the lower surface of the guide ring 16 by the reaction force exerted on the tapered face 19b from the stopper pin 30, the urging condition thus obtained tends to become unstable. Then, the unstable condition makes the roller 17 and the post 18 provided on the carriage 19 shaky. The shaky state of these members then makes the travel of the tape 6 unstable to deteriorate the quality of a recording or reproduction signal. Since the positioning accuracy if greatly dependent on the machining errors of parts, the accuracy of one unit of the VCR product becomes different from that of another unit of VCR. It has been, therefore, hardly possible to manufacture VCR units with uniform accuracy and the VCR products have had poor interchangeability.

Figure 3:
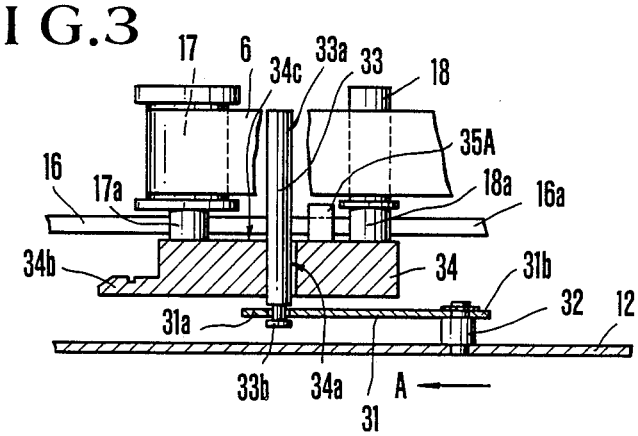
FIG. 3 is a side view showing the details of an embodiment of the invention including tape wrapping means, drive means therefor and connecting means for connecting them.
Figure 4:
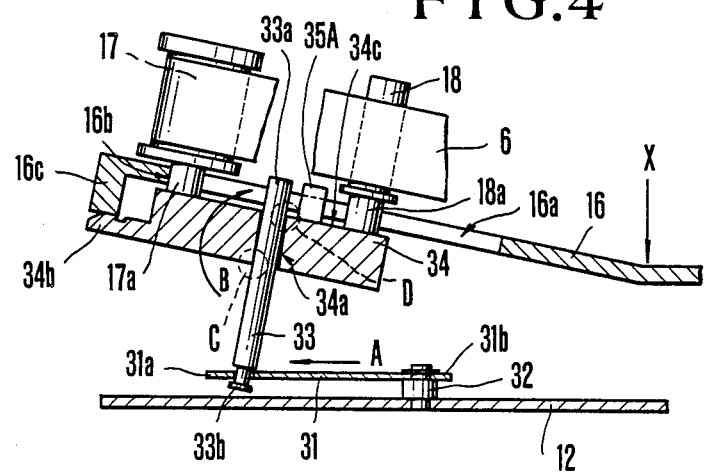
FIG. 4 is a side view showing the tape wrapping means in relation to drive means and connecting means of FIG. 3 as in a tape loading completed state in the same manner as FIG. 2.
Figure 5:
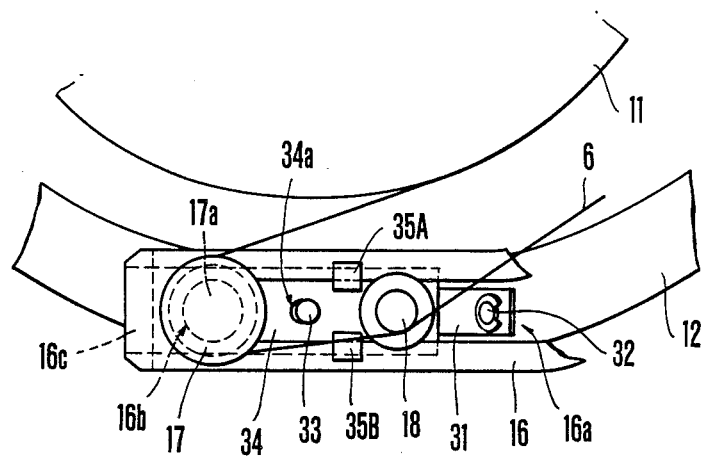
FIG. 5 is a plan view of the tape wrapping means of FIG. 3 as in a tape loading completed state.

This invention is directed to the solution of this problem. A preferred embodiment of the invention is arranged as shown in FIGS. 3, 4 and 5. These drawings show the tape wrapping means of the embodiment in relation to drive means and connecting arrangement between them. The parts of the VCR other than these parts are same as the conventional VCR shown in FIG. 1. Further, the parts and members which are same as those shown in FIGS. 1 and 2 are indicated by the same reference numerals.

Referring to FIGS. 3, 4 and 5, a driving lever 31 has its tail part 31b turnably attached to an upper end part of a pin 32 secured to the loading ring 12. The lever 31 is thus arranged to form drive means for tape wrapping means in conjunction with the loading ring 12. The driving lever 31 is loosely engaged at its fore end part 31a with a lower end part 33b of a connecting rod 33 which is arranged to serve as connecting means. The connecting rod 33 is loosely engaged with a through hole 34a formed in the middle part of the carriage 34 of the tape wrapping means perpendicularly to a guide post carrying face 34c of the carriage 34. The rod 33 is thus arranged to be movable along the through hole 34a. The carriage 34 is provided with the tape guide roller 17 and the post 18 in the same manner as in the case of the prior art shown in FIGS. 1 and 2. As shown in FIG. 5, the carriage 34 is provided with hook members 35A and 35B which are secured to both sides of the carriage 34 and are arranged to engage with the upper surface of the guide ring 16 through the guide groove or slot 16a of the ring 16.

Referring to FIG. 4, the end part 16b of the guide groove or slot 16a of the guide ring 16 corresponding to the tape loading completion position is arranged to restrict the position of the tape guide roller 17 by colliding with the smaller diameter part 17a of the tape guide roller 17. The fore end part of the guide ring 16 is formed into a restricting part 16c which protrudes downward to be able to collide against an abutting part 34b provided at the fore end of the carriage 34.

In the same manner as has been described with reference to FIGS. 1 and 2, when the loading ring 12 is caused to turn in the direction of arrow A with the loading motor 13 started for loading the drum assembly 11 with the tape, the carriage 34 is moved by the driving lever 31 via the connecting rod 33 in the same direction while being guided by the guide groove or slot 16a of the guide ring 16. Accordingly, the tape 6 is pulled out from the cassette 1 by the guide roller 17 and the post 18. The details of this operation is as shown in FIG. 3. FIG. 3 shows the carriage 34 as in a state of travelling along the portion of the guide ring 16 which is in parallel with the loading ring 12. When the carriage 34 arrives at a point X of the guide ring 16, the carriage 34 moves along the upward slope of the guide ring 16. Since the connecting rod 33 is loosely engaged with the hole 34a of the carriage 34 in this instance, the upward movement of the carriage 34 remains unhindered at all. When the carriage 34 reaches the tape loading completion position as shown in FIG. 4, the small diameter part 17a of the guide roller 17 comes to collide with the end part 16b of the guide slot 16a of the guide ring 16 to restrain the carriage 34 from moving further. At this instant, the fore end abutting part 34b of the carriage 34 is inserted below the downward protrudent restricting part 16c formed at the fore end of the guide ring 16 leaving a very small clearance between them. Under this condition, the connecting rod 33 comes to engage the hole 34a of the carriage 34 at its upper end part 33a. With the carriage 34 coming to stop in this manner, the loading ring 12 is still overdriven or overshot to a slight extent as has been described with reference to FIGS. 1 and 2. Then, although the upper end part 33a of the connecting rod 33 has been brought to stop by the carriage 34, the lower end part 33b of the connecting rod 33 is further driven or overdriven in the direction of arrow A. As a result of this, as shown in FIG. 4, the connecting rod 33 is tilted to the right within the hole 34a of the carriage 34 and comes to abut on the left lower end part C and the right upper end part D of the inner surface of the hole 34a. This tilting abutment applies to the carriage 34 a moment in the direction of arrow B in addition to the force exerted in the direction of arrow A. This brings the fore end abutting part 34b of the carriage 34 into pressed contact with the restricting part 16c of the guide ring 16. Further, the hook members 35A and 35B are also brought into pressed contact with the upper surface of the guide ring 16. In this manner, the carriage 34 and therefore the guide roller 17 and the post 18 are accurately and reliably positioned and are kept in their tape loading completed positions respectively.

In accordance with the arrangement of the embodiment described, the colliding contact face of the fore end abutting part 34b of the carriage 34 and that of the fore end downward protrudent restricting part 16c of the guide ring 16 can be flatly formed. Therefore, compared with the tapered face 19b of the carriage 19 of the prior art apparatus, the machining precision for these contact faces of the embodiment can be much more easily enhanced. Accordingly, the tape wrapping means can be reliably positioned relative to the guide means with a highly stable force relation between them. Further, since the positioning arrangement for the tape wrapping means can be arranged with unvarying degree of precision, the invention ensures excellent interchangeability which is important among magnetic recording and/or reproducing apparatuses.

Figure 6:
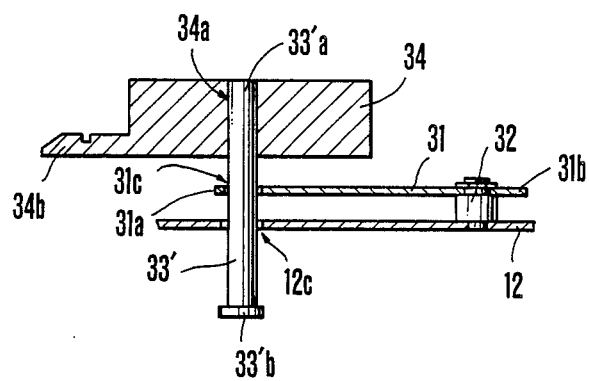
FIG. 6 is a side view showing another example of arrangement for connecting the tape wrapping means to the drive means.

FIG. 6 shows another example of arrangement for connecting the carriage 34 and the driving lever 31 to each other. In this instance, a connecting rod 33' is either tightly or rigidly connected at its upper end part 33'a to the hole 34a of the carriage 34. Meanwhile, the fore end part 31a of the driving lever 31 and a part of the loading ring 12 are respectively provided with through holes 31c and 12c for having the connecting rod 33' pierce through these holes 31c and 12c. The rod 33' is provided with a part 33'b for preventing it from pulling out.

While the preferred embodiments have been described, the invention is of course not limited to the arrangement of the embodiments and it is to be understood that changes and variations may be made without departing from the scope of the following claims.

What I claim is:

1. A recording and/or reproducing apparatus arranged to use a belt shaped record bearing medium comprising:

(A) recording and/or reproducing means including:

head means for recording signals on and/or reproducing recorded signals from the record bearing medium, and cylindrical means for guiding the record bearing medium relative to said head means;

(B) wrapping means for wrapping the record bearing medium about said cylindrical means, said wrapping means including at least one wrapping member and a movable carriage member for carrying said wrapping member;

(C) drive means for moving said wrapping means around said cylindrical means to a predetermined position by moving said movable carriage member;

(D) restriction means for restricting said wrapping means at said predetermined position;

(E) connecting means for operatively connecting said wrapping means and said drive means, said connecting means including a rod member substantially perpendicular to said wrapping means, said rod member being loosely engaged with said movable carriage member, and being supported at two points by said movable carriage member when said movable carriage member reaches said predetermined position; and (F) control means for controlling said drive means, to deactivate the drive means at an overdriven condition relative to the stoppage of said wrapping means at said predetermined position so that a rotational moment is exerted on the wrapping means through said rod member and the wrapping means is firmly secured relative to said restriction means at the predetermined position.

2. The apparatus according to claim 1, further comprising:
guide means for guiding said wrapping means around said cylindrical means to said predetermined position, wherein said restriction means is provided on a portion of said guide means.

3. The apparatus according to claim 2, wherein said carriage member is movably engaged with said guide means, and moves along said guide means, and wherein said rod member is connected to said movable carriage member such that when said rod member rotates said movable carriage member also rotates, and said rotation moment is exerted on the movable carriage member to firmly secure the movable carriage member relative to said restriction means.

4. The apparatus according to claim 3, wherein said rod member is connected to said drive means such that said rod member rotates in correspondence to the movement of said drive means.

5. The apparatus according to claim 3, wherein said movable carriage member has a contact surface which contacts said restriction means at a right angle to the movement direction of said movable carriage member.

6. An apparatus according to claim 1, wherein said drive means includes a ring shaped member rotatable around said cylindrical means.

7. An apparatus according to claim 6, wherein said rod member is arranged almost vertical to the rotation direction of said ring shaped member.

8. An apparatus according to claim 7, wherein said ring shaped member has a drive portion for driving said movable carriage member, and is loosely connected to said drive means through said drive portion.

9. A recording and/or reproducing apparatus arranged to use a belt shaped record bearing medium, comprising:

(A) recording and/or reproducing means including:

head means for the recording signals on and/or reproducing recorded signals from the record bearing medium, and cylindrical means for guiding the record bearing medium relative to said head means;

(B) wrapping means for wrapping the record bearing medium about said cylindrical means, said wrapping means including at least one wrapping member and a movable carriage member for carrying said wrapping member;

(C) drive means for moving said wrapping means around said cylindrical means to a predetermined position by moving said movable carriage member;

(D) guide means for guiding said wrapping means which is movably engaged with said guide means;

(E) restriction means for restricting said wrapping means at said predetermined position;

(F) connecting means for operatively connecting said wrapping means and said drive means, said connecting means including a rod member being loosely connected with said movable carriage member and being connected to said drive means, and said rod member being arranged to cause the distance between connection points on said rod member connecting between said movable carriage member and said drive means respectively to vary when said wrapping means reaches said predetermined position in accordance with the movement of said drive means; and (G) control means for controlling said drive means, said control means being arranged to deactivate the drive means at an overdriven condition relative to the stoppage of said wrapping means at said predtermined position so that a moment is exerted on the wrapping means through said rod member and the wrapping means is firmly secured relative to said restriction means at the predetermined position.

10. The apparatus according to claim 9, wherein said guide means has a portion inclined at a predetermined angle to said drive means.

11. The apparatus according to claim 9, wherein said rod member is arranged so as to make longest the distance between the connection points on the movable carriage member and said drive means respectively when said wrapping means reaches said predetermined position.

12. An apparatus according to claim 9, wherein said drive means includes a ring shaped member rotatable around said cylindrical means.

13. An apparatus according to claim 12, wherein said rod member is arranged almost vertical to the rotation direction of said ring shaped member.

14. An apparatus according to claim 13, wherein said ring shaped member has a drive portion for driving said movable carriage member and is connected to said drive means through said drive portion.

15. A magnetic tape recording and/or reproducing apparatus arranged to use a magnetic tape housed in a cassette, comprising:

(A) a drum assembly provided with rotatable magnetic heads for recording signals on and/or reproducing recorded signals from the tape;

(B) at least one tape wrapping member for pulling out the tape from the cassette and for wrapping the pulled out tape about said drum assembly;

(C) a movable carriage member for carrying said wrapping member;

(D) a ring shaped member rotatable around said drum assembly, said ring shaped member having a drive portion for driving said movable carriage member;

(E) a guide member for guiding said carriage member around said drum assembly to a predetermined position, and said guide member has a portion inclined at a predetermined angle to said ring shaped member;

(F) restriction means for restricting said movable carriage member at said predetermined position;

(G) a rod shaped member for operatively connecting said movable carriage member and said ring shaped member, said rod shaped member being connected to said movable carriage member in such a manner that when said rod shaped member rotates said movable carriage member also rotates, said rod shaped member being loosely connected with said drive portion of said ring shaped member and said rod shaped member being arranged to cause the distance between connection points on said rod shaped member connecting between said movable carriage member and said drive portion of said ring shaped member respectively to vary when said movable carriage member reaches said predetermined position in accordance with the movement of said ring shaped member;

(H) a motor for rotating said ring shaped member around said drum assembly; and (I) a control circuit for controlling said motor, said control circuit being arranged to stop the motor at an overdriven condition of said ring shaped member relative to the stoppage of said movable carriage member at said predetermined position.

16. The apparatus according to claim 15, wherein said rod shaped member is arranged to make longest the distance between the connection points of said movable carriage member and said drive portion of said ring shaped member respectively when said motor stops.

17. The apparatus according to claim 15, wherein said rod shaped member starts to rotate when said movable carriage member reaches the inclined portion said guide member.

18. An apparatus according to claim 15, wherein said wrapping member includes a rotatable roller.

* * * * *

UNITED STATES PATENT AND TRADEMARK OFFICE
CERTIFICATE OF CORRECTION

PATENT NO. : 4,739,421

DATED : April 19, 1988

INVENTOR(S) : Takashi Narasawa

It is certified that error appears in the above-identified patent and that said Letters Patent is hereby corrected as shown below:

Column 1, line 60, change "recorded" to -- record --

Column 3, line 17, change "its" to -- it --

Column 4, line 6, delete "are"

Column 5, line 2, change "if" to -- is --

Column 8, line 23, (Claim 9 (F)) delete "on" and insert -- connecting --

Column 8, line 25, (Claim 9 (F)) delete "connecting"

Column 8, lines 32-33 (Claim 9 (G)) change "predtermined" to -- prede-termined --

Column 9, line 20, (Claim 15 (G)) change "on" to -- connecting between --

Column 9, line 21, (Claim 15 (G)) delete "connecting between" and insert -- and --

UNITED STATES PATENT AND TRADEMARK OFFICE
CERTIFICATE OF CORRECTION

PATENT NO. : 4,739,421

DATED : April 19, 1988

INVENTOR(S) : Takashi Narasawa

It is certified that error appears in the above-identified patent and that said Letters Patent is hereby corrected as shown below:

Column 10, line 18, (Claim 17) insert -- of -- between "portion" and "said"

Signed and Sealed this

Eleventh Day of October, 1988

Attest:

DONALD J. QUIGG

Attesting Officer

Commissioner of Patents and Trademarks